United States Patent
Kameya (10) Patent No.: US 8,290,076 B2
(45) Date of Patent: Oct. 16, 2012

(54) RECEIVER, SIGNAL PROCESSING APPARATUS AND RECEIVING METHOD

(75) Inventor: Jun Kameya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 249 days.

(21) Appl. No.: 12/820,304

(22) Filed: Jun. 22, 2010

(65) Prior Publication Data

US 2010/0329373 A1 Dec. 30, 2010

(30) Foreign Application Priority Data

Jun. 30, 2009 (JP) ................................. 2009-154895

(51) Int. Cl.
*H04K 1/10* (2006.01)
*H04L 27/28* (2006.01)

(52) U.S. Cl. ........ 375/260; 375/267; 370/203; 370/208; 370/210

(58) Field of Classification Search .................. 375/260, 375/267, 299; 370/203–211
See application file for complete search history.

(56) References Cited

U.S. PATENT DOCUMENTS

| 5,682,376 A | 10/1997 | Hayashino et al. |
| 6,452,977 B1 * | 9/2002 | Goldston et al. ............... 375/260 |
| 2004/0062317 A1 | 4/2004 | Uesugi et al. |
| 2008/0002645 A1 | 1/2008 | Seki et al. |
| 2008/0187066 A1 * | 8/2008 | Wang et al. .................... 375/267 |

FOREIGN PATENT DOCUMENTS

| JP | 8-321820 | 12/1996 |
| JP | 2004-320677 | 11/2004 |
| JP | 2008-11037 | 1/2008 |
| JP | 2008-118567 | 5/2008 |
| WO | 03/021833 | 3/2003 |

\* cited by examiner

*Primary Examiner* — Curtis Odom
(74) *Attorney, Agent, or Firm* — Katten Muchin Rosenman LLP (57) ABSTRACT

A receiver for receiving a signal including a series of symbols, the signal being performed Time Window processing at portions including a boundary of adjacent symbols by a transmitter so as to eliminate a discontinuity between the symbols, the receiver includes: a receiving unit that receives the signal; and a processor extracts the series of symbols and performing an inverse processing of the Time Window processing at the portions performed the Time Window processing by the transmitter.

7 Claims, 8 Drawing Sheets

WAIT WITHOUT PERFORMING DEMODULATION UNTILE OFDM SYMBOL #n + 1 IS RECEIVED

FIG. 5B

MULTIPLY PARTIAL DATA a BY WINDOW FUNCTION

⇩ SUBTRACTION

FIG. 5C

SUBTRACT PARTIAL DATA a FROM OFDM SYMBOL #n

⤴ INVERSE VALUE OF WINDOW FUNCTION

⇩ MULTIPLICATION

FIG. 5D

MULTIPLY OFDM SYMBOL #n BY INVERSE VALUE OF WINDOW FUNCTION

RECEIVER, SIGNAL PROCESSING APPARATUS AND RECEIVING METHOD

CROSS-REFERENCE TO RELATED APPLICATION

This application is based upon and claims the benefit of priority of the prior Japanese Patent Application No. 2009-154895, filed on Jun. 30, 2009, the entire contents of which are incorporated herein by reference.

FIELD

A certain aspect of the embodiment discussed herein relates to a radio receiving apparatus included in a radio communication system.

BACKGROUND

In an Orthogonal Frequency Division Multiplexing (OFDM) transmission method used in radio communication, signal transmission is performed with a plurality of subcarriers orthogonal to each other. Accordingly, with the OFDM transmission method, it is possible to achieve high frequency utilization efficiency and high-speed transmission. A transmission OFDM symbol sequence is divided into a plurality of transmission OFDM symbols, and these transmission OFDM symbols are transmitted in parallel with a large number of subcarriers. As a result, it is possible to reduce a transmission speed for a single subcarrier and reduce multipath delay interference.

In the OFDM transmission method, in order to reduce multipath delay interference, a guard interval (GI) is set between OFDM symbols. By setting a guard interval having a time length longer than a multipath delay time, it is possible for a receiver to exclude a portion affected by a delay wave from received OFDM symbols and demodulate these OFDM symbols.

Figure 1:
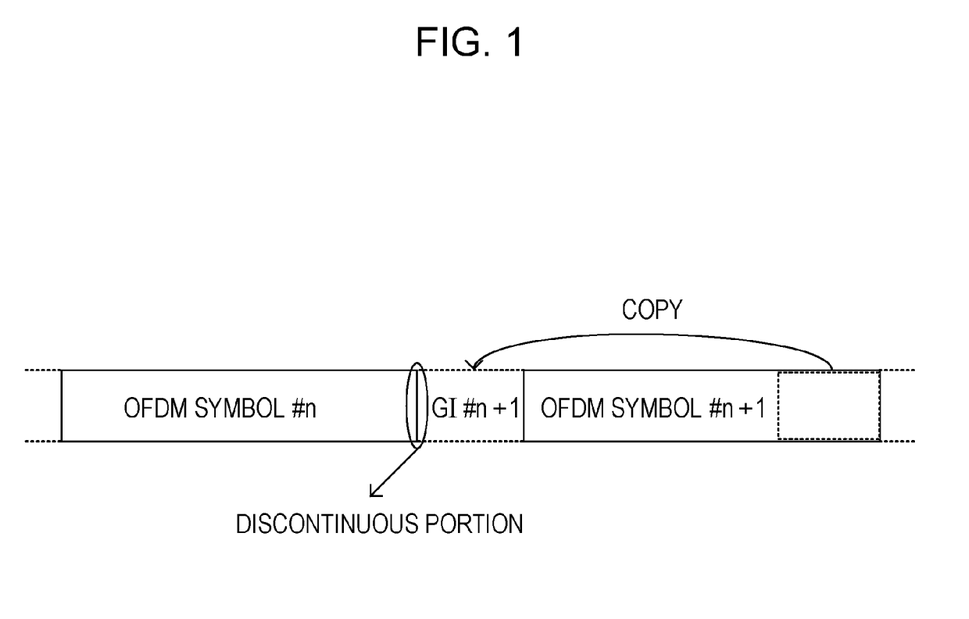
FIG. 1 is a diagram describing a guard interval.

FIG. 1 is a diagram describing a guard interval. A guard interval (Cyclic Prefix) is generated by copying the end portion of an OFDM symbol and pasting the end portion to the head portion of the OFDM symbol. Referring to FIG. 1, the end portion of an OFDM symbol #n+1 is copied and is then pasted to the head portion of the OFDM symbol #n+1 (a guard interval GI #n+1). At that time, while there is continuity between the signal of a target OFDM symbol (the OFDM symbol #n+1) and the signal of the guard interval GI #n+1, there is discontinuity between the signal of a preceding OFDM symbol (an OFDM symbol #n) and the signal of the guard interval GI #n+1. Such signal discontinuity generates a high-frequency component, the high-frequency component causes out-of-band power leakage, and the out-of-band power leakage becomes interference in an adjacent channel. Examples of processing for reducing a high-frequency component generated by signal discontinuity between OFDM symbols include Time Window processing (see, Japanese Laid-open Patent Publication No. 2008-11037).

Figure 2A:
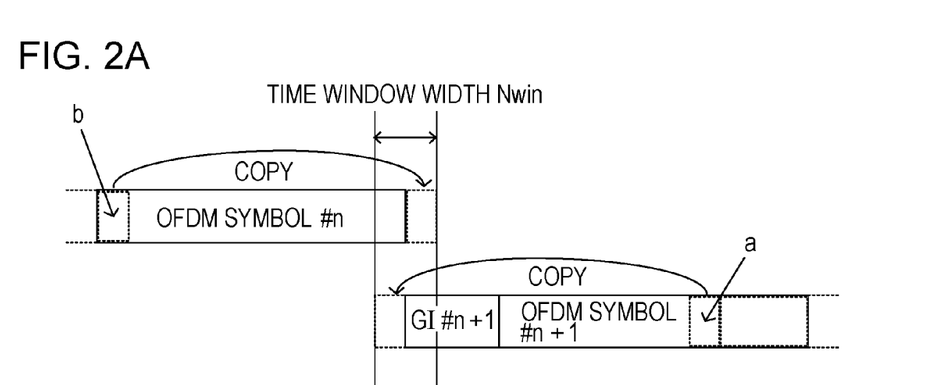
FIGS. 2A to 2D are diagrams describing Time Window processing.

FIGS. 2A to 2D are diagrams describing Time Window processing. In Time Window processing, discontinuity is eliminated by smoothly attenuating a target OFDM symbol and the next OFDM symbol between these OFDM symbols with a raised cosine waveform and adding the attenuated portions of these OFDM symbols so that the attenuated portions overlap each other. More specifically, as illustrated in FIG. 2A, when a Time Window width is Nwin, a portion (partial data a) having a width (Nwin/2) half the Time Window width Nwin is extracted from an OFDM symbol #n+1 and is then added to the head portion of a guard interval GI #n+1 and a portion (partial data b) having the width (Nwin/2) half the Time Window width Nwin is extracted from an OFDM symbol #n and is then added to the end portion of the OFDM symbol #n.

Figure 2B:
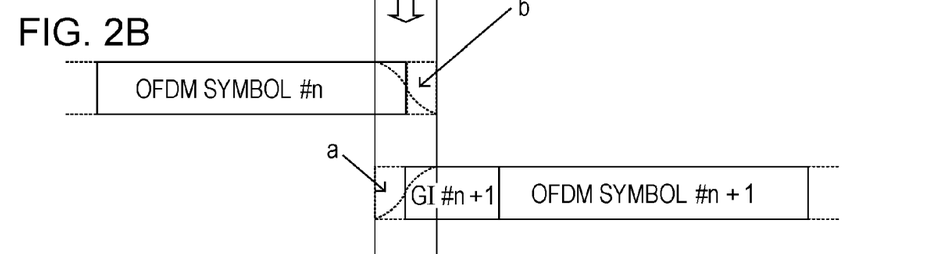
Figure 2C:
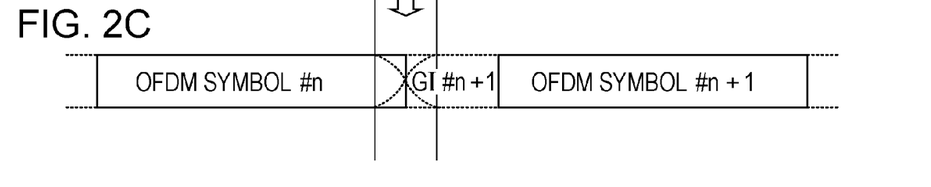

The end portion of the OFDM symbol #n including the partial data b having the Time Window width Nwin is multiplied by the coefficient of a Raised Cosine function. The head portion of the guard interval GI #n+1 including the partial data a having the Time Window width Nwin is multiplied by a window function (for example, a Raised Cosine function). By multiplying the end of an OFDM symbol by a Raised Cosine function, a smoothly decaying waveform is generated as illustrated in FIG. 2B. The end portion of the OFDM symbol #n having the Time Window width and the head portion of the guard interval GI #n+1 of the OFDM symbol #n+1 having the Time Window width are added so that they overlap each other as illustrated in FIG. 2C. By performing the Time Window processing, it is possible to reduce a high-frequency component and interference in an adjacent channel.

Figure 2D:
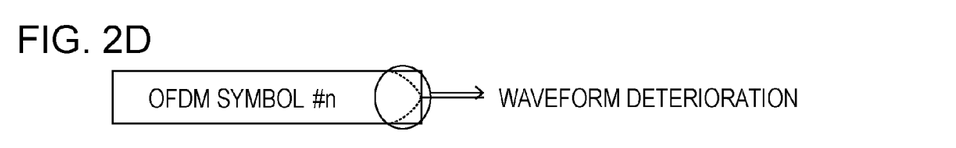

However, around the boundary between the OFDM symbols, the waveform of a target OFDM symbol (the OFDM symbol #n) is attenuated and overlaps the waveform of the next OFDM symbol (the OFDM symbol #n+1). As a result, the original waveform of the target OFDM symbol (the OFDM symbol #n) is deteriorated as illustrated in FIG. 2D. This leads to the deterioration of a bit error rate (BER) on the side of a receiver and the degradation of a reception characteristic.

Figure 3:
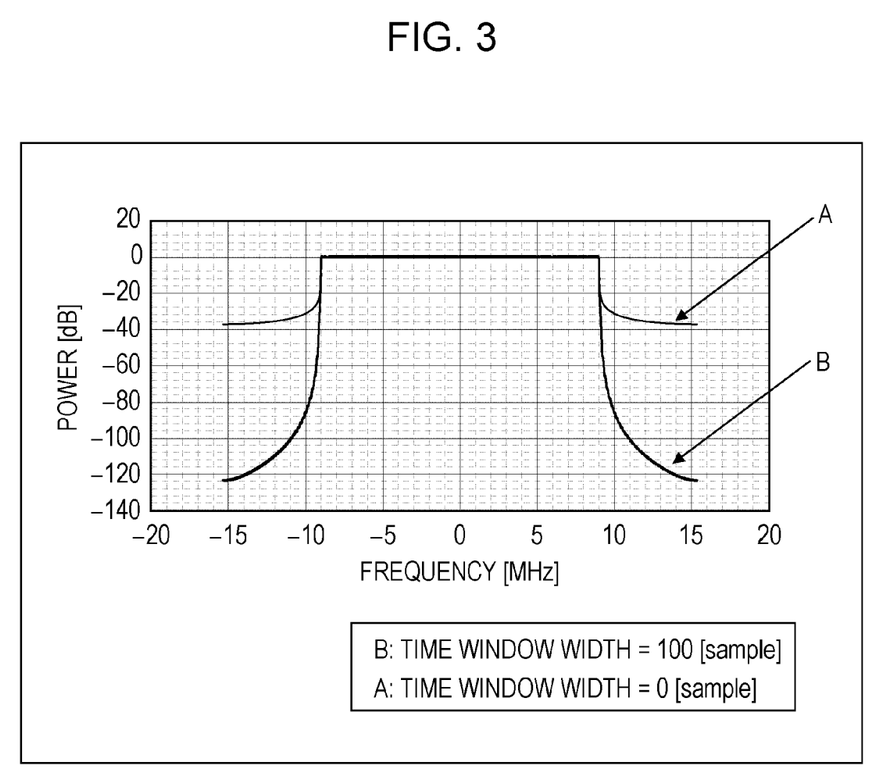
FIG. 3 is a graph illustrating the difference between a transmission spectrum obtained with the Time Window processing and a transmission spectrum obtained with no Time Window processing.

FIG. 3 is a graph illustrating the difference between a transmission spectrum obtained with the Time Window processing and a transmission spectrum obtained with no Time Window processing. The base of a spectrum represented by a curve A obtained with no Time Window processing (a Time Window width=100 [sample]) is high. On the other hand, the base of a spectrum represented by a curve B obtained with the Time Window processing (a Time Window width=100 [sample]) is low since a high-frequency component is reduced.

Figure 4:
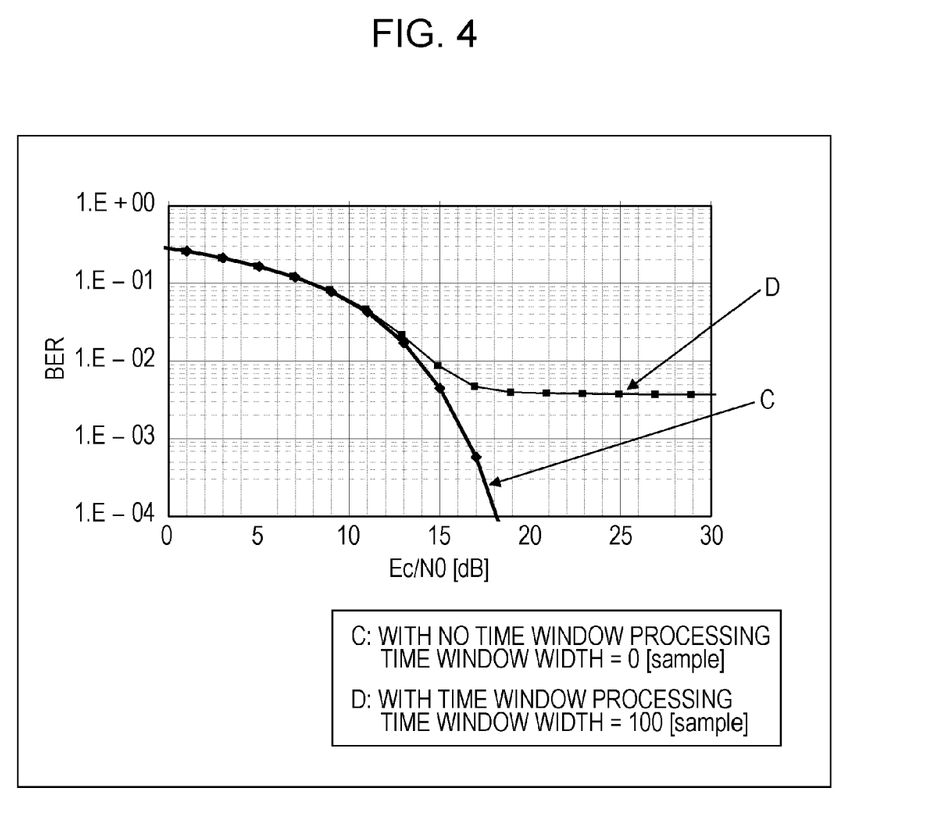
FIG. 4 is a graph illustrating the difference between a bit error rate (BER) obtained with the Time Window processing and a bit error rate obtained with no Time Window processing.

FIG. 4 is a graph illustrating the difference between a bit error rate (BER) obtained with the Time Window processing and a bit error rate obtained with no Time Window processing. As represented by a curve C obtained with no Time Window processing (a Time Window width=0 [sample]), the larger Ec/N0 (a signal-to-noise ratio) (the lower noise), the smaller BER. On the other hand, as represented by a curve D obtained with the Time Window processing (a Time Window width=100 [sample]), the reduction in BER is suppressed at approximately Ec/N0=13 [dB], and BER is constant and is not changed at values equal to or larger than approximately Ec/N0=19 [dB].

In examples illustrated in FIGS. 3 and 4, the length of an OFDM symbol (before addition of a GI) is 2048 [sample], and the length of a guard interval is 160 or 144 [sample]. Furthermore, one sub-frame is composed of fourteen (No. 0 to No. 13) OFDM symbols. The length of guard intervals of OFDM symbols having Nos. 0 and 7 is 160 [sample], and the length of guard intervals of the other OFDM symbols is 144 [sample]. Sill furthermore, OFDM symbols having Nos. 3 and 10 are reference signals.

SUMMARY

According to an aspect of an embodiment, a receiver for receiving a signal including a series of symbols, the signal being performed Time Window processing at portions including a boundary of adjacent symbols by a transmitter so as to eliminate a discontinuity between the symbols, the receiver includes: a receiving unit that receives the signal; and a processor extracts the series of symbols and performing an inverse processing of the Time Window processing at the portions performed the Time Window processing by the transmitter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

A radio receiving apparatus according to an embodiment of the present invention performs reverse processing of the Time Window processing performed by a transmitter upon a received OFDM symbol. A radio transmission apparatus that is the transmitter inserts a guard interval (GI) between OFDM symbols, performs the Time Window processing so as to eliminate the discontinuity between the OFDM symbols, and transmits the OFDM symbols. A radio receiving apparatus that is a receiver detects a time at which received data is demodulated, removes the guard interval from the received data, and demodulates the received data excluding the guard interval. At that time, the ends of the OFDM symbols included in the received data are deteriorated by the Time Window processing performed by the transmitter. Accordingly, a radio receiving apparatus according to an embodiment of the present invention performs the reverse processing of the Time Window processing (hereinafter referred to as Time Window cancellation processing) upon part of the OFDM symbols that has been deteriorated by the Time Window processing so as to cancel the Time Window processing. As a result, a deteriorated signal is practically brought back to an original state, so that the deterioration of a bit error rate can be prevented.

FIGS. 5A to 5D are diagrams describing Time Window cancellation processing according to an embodiment of the present invention. Time Window cancellation processing performed upon an OFDM symbol #n will be described with reference to FIGS. 5A to 5D. In the Time Window processing performed by a transmitter, the end portion of the OFDM symbol #n having a Time Window width and the head portion of an OFDM symbol #n+1 having the Time Window width are individually multiplied by a window function (Raised cosine function), and are then added. Accordingly, the Time Window cancellation processing is performed upon the OFDM symbol #n in accordance with a procedure opposite to that of the Time Window processing.

Figure 5A:
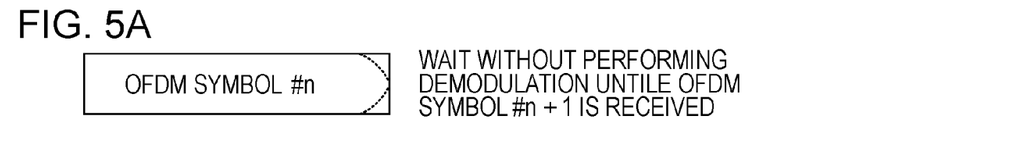
FIGS. 5A to 5D are diagrams describing Time Window cancellation processing according to an embodiment of the present invention.

(1) Upon receiving the OFDM symbol #n, a radio receiving apparatus waits without demodulating the OFDM symbol #n until it receives the next OFDM symbol #n+1 (see, FIG. 5A).

Figure 5B:
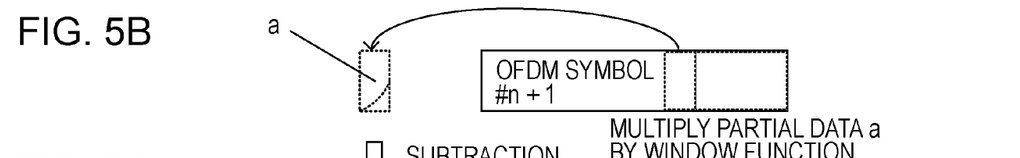

(2) Upon receiving the OFDM symbol #n+1, the radio receiving apparatus extracts from the OFDM symbol #n+1 the partial data a overlapping the end portion of the OFDM symbol #n upon which the Time Window processing has been performed, and multiplies the partial data a by the same window function as that used by the transmitter (see, FIG. 5B).

Figure 5C:
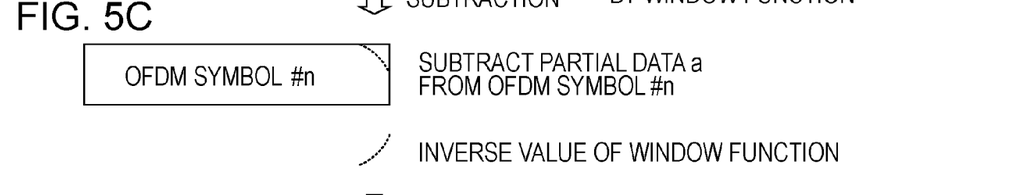

(3) The radio receiving apparatus subtracts the partial data a multiplied by the window function from the end portion of the OFDM symbol #n upon which the Time Window processing has been performed (see, FIG. 5C).

Figure 5D:
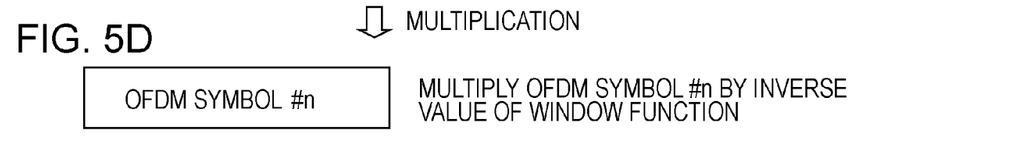

(4) The radio receiving apparatus multiplies the end portion of the OFDM symbol #n upon which the Time Window processing has been performed by the inverse value of the window function used in the transmitter (see, FIG. 5D).

Through the process from (1) to (4), it is possible to cancel the Time Window processing performed by the transmitter and markedly reduce degradation in reception characteristic caused by the Time Window processing. When the Time Window width is increased, a high-frequency component can be significantly reduced. However, in the related art, when the Time Window width is increased, the degree of deterioration of a waveform is increased. This leads to the degradation in reception characteristic. However, according to an embodiment of the present invention, irrespective of the Time Window width, it is possible to bring a waveform upon which a transmitter has performed the Time Window processing back to an original waveform, perform demodulation without degrading a bit error rate, and reduce a high-frequency component.

Figure 6:
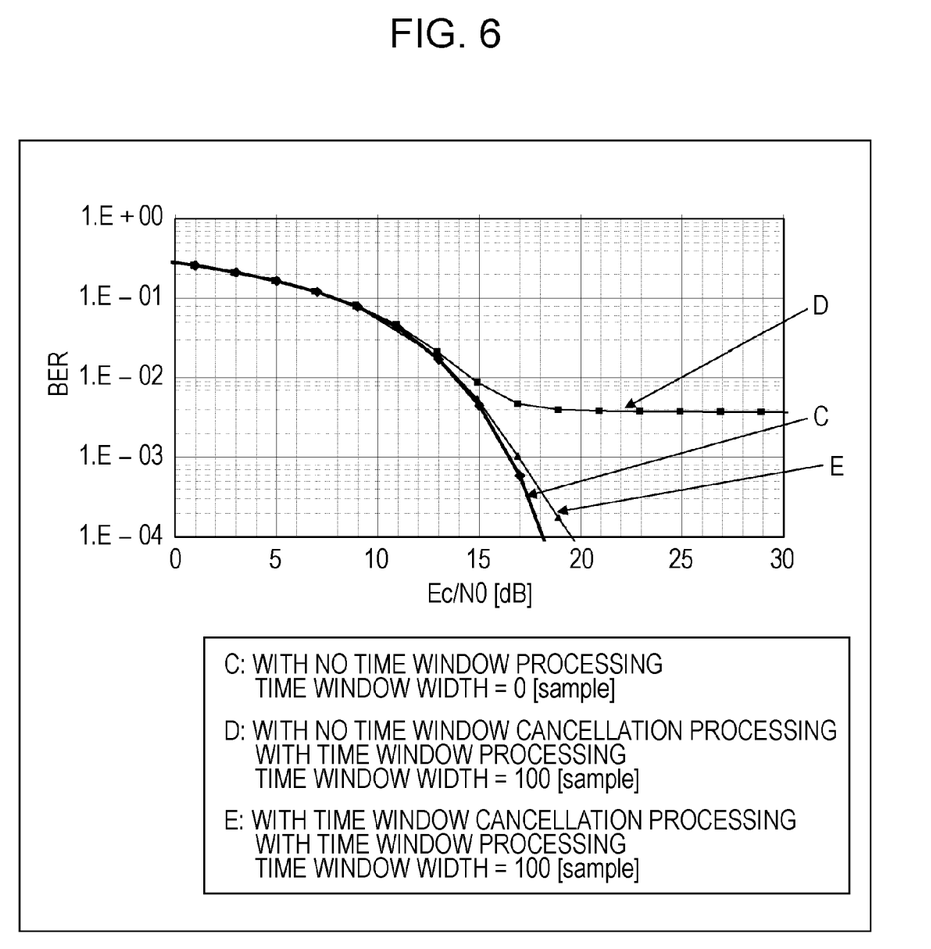
FIG. 6 is a graph illustrating the difference between a bit error rate (BER) obtained with Time Window cancellation processing according to an embodiment of the present invention and a bit error rate (BER) obtained with no Time Window cancellation processing.

FIG. 6 is a graph illustrating the difference between a bit error rate (BER) obtained with Time Window cancellation processing according to an embodiment of the present invention and a bit error rate (BER) obtained with no Time Window cancellation processing. A curve C and a curve D are the same as the curve C illustrated in FIG. 4 and the curve D illustrated in FIG. 4, respectively. That is, the curve C is a graph representing the change in BER when Time Window processing is not performed. The curve D is a graph representing the change in BER when a transmitter performs the Time Window processing and a receiver does not perform Time Window cancellation processing according to an embodiment of the present invention. A curve E is a graph representing the change in BER when a transmitter performs the Time Window processing and a receiver performs Time Window cancellation processing according to an embodiment of the present invention. Like in the case of the curve D, in the case of the curve E, a Time Window width is set to 100 [sample].

Accordingly, a transmission spectrum corresponding to the curve E is represented by the curve B (a Time Window width=100 [sample]) illustrated in FIG. 3, and a high-frequency component is reduced as represented by the curve B. Like in the examples illustrated in FIGS. 3 and 4, in an example illustrated in FIG. 6, an OFDM symbol length (before addition of a GI) is set to 2048 [sample], and a guard interval length is set to 160 or 144 [sample]. Furthermore, one sub-frame is composed of fourteen (No. 0 to No. 13) OFDM symbols. The guard interval length of the OFDM symbols having Nos. 0 and 7 is 160 [sample], and the guard interval length of the other OFDM symbols is 144 [sample]. The OFDM symbols having Nos. 3 and 10 are reference signals.

Dislike in the case of the curve D, in the case of the curve E, even if Ec/N0 is increased, the enhancement of BER is not suppressed. The curve E is similar to the curve C representing the change in BER when Time Window processing is not performed, and indicates that a BER is significantly improved. Thus, by performing Time Window cancellation processing according to an embodiment of the present invention, even if the Time Window processing is performed, it is possible to perform demodulation without degrading a BER and achieve the reduction in a high-frequency component.

Figure 7:
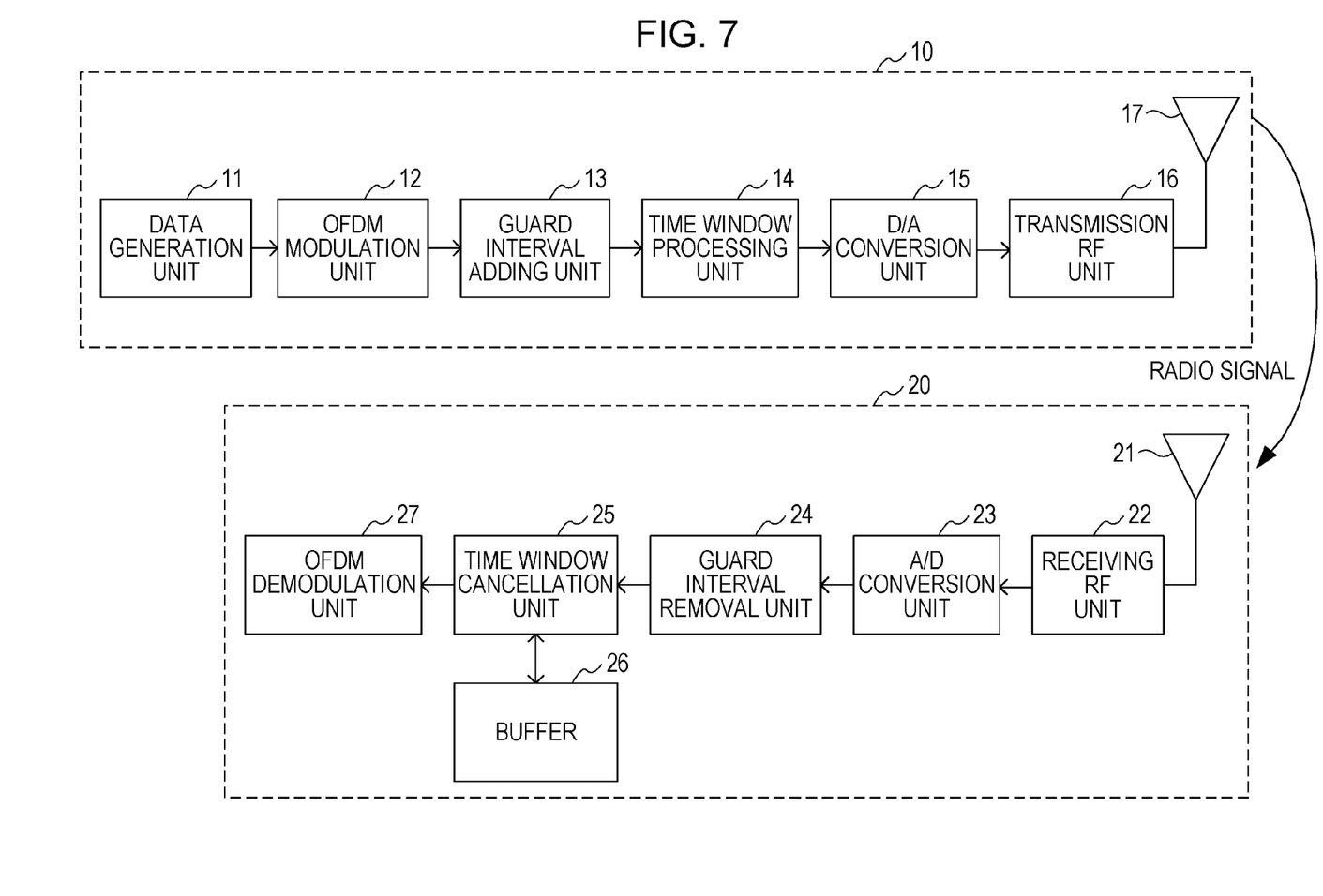
FIG. 7 is a diagram illustrating an exemplary configuration of a radio communication system including a radio receiving apparatus according to an embodiment of the present invention.

FIG. 7 is a diagram illustrating an exemplary configuration of a radio communication system including a radio receiving apparatus according to an embodiment of the present invention. For example, a radio communication system according to an embodiment of the present invention is a mobile communication system employing Long Term Evolution (LTE) (hereinafter also referred to as an LTE system). LTE is a 3G Wideband Code Division Multiple Access (W-CDMA) high-speed data communication specification, and employs OFDM as a transmission method. LTE is standardized by 3rd Generation Partnership Project (3GPP) TS36 series.

A radio transmission apparatus 10 included in the LTE system functions as a mobile terminal apparatus for an uplink and a radio base station apparatus for a downlink. The radio transmission apparatus 10 includes a data generation unit 11, an OFDM modulation unit 12, a guard interval adding unit 13, a Time Window processing unit 14, a D/A conversion unit 15, a transmission RF unit 16, and an antenna 17.

The OFDM modulation unit 12 generates OFDM symbols from data generated by the data generation unit 11 by turbo encoding data (data of 1 and 0), modulating the turbo-encoded data using a multi-level modulation method such as Quadrature Phase Shift Keying (QPSK) or 16 Quadrature Amplitude Modulation (16QAM), setting modulated signals for subcarriers, performing Inverse Fast Fourier Transform (IFFT) processing upon the modulated signals, and converting the modulated signals into frequency signals.

The guard interval adding unit 13 receives the OFDM symbols from the OFDM modulation unit 12, copies the end portion of each of the OFDM symbols having a predetermined width, and adds the copied end portion to the head of the OFDM symbol as a guard interval (GI). The guard interval is also referred to as a Cyclic Prefix. Since the OFDM symbol has been subjected to IFFT, the OFDM symbol has a time-continuous waveform from the head of the OFDM symbol to the end of the OFDM symbol. Therefore, as described previously, the boundary between the guard interval and the head of the OFDM symbol the end portion of which has been copied has a time-continuous waveform, and no high-frequency component is generated at the boundary. However, the boundary between the OFDM symbol to which the guard interval has been added and the end of an OFDM symbol preceding the OFDM symbol is discontinuous and a high-frequency component therefore occurs at the boundary.

The Time Window processing unit 14 performs the Time Window processing described previously with reference to FIGS. 2A to 2D upon the boundary between the OFDM symbols at which a high-frequency component is generated. The Time Window processing unit 14 smoothly attenuates waveforms at the boundary between the OFDM symbols using a window function (for example, a Raised Cosine function) and overlays one of the waveforms on the other one of the waveforms. As a result, these waveforms are smoothed at the boundary between the OFDM symbols, and a high-frequency component is reduced.

The D/A conversion unit 15 converts the OFDM symbols upon which the Time Window processing has been performed into an analog signal. The transmission RF unit 16 performs radio transmission processing including orthogonal modulation and the frequency conversion from a baseband frequency into a radio frequency (RF) upon the analog signal and transmits a radio signal from the antenna 17.

Next, a radio receiving apparatus 20 included in the LTE system will be described. The radio receiving apparatus 20 functions as a radio base station apparatus for an uplink and a mobile terminal apparatus for a downlink. The radio receiving apparatus 20 includes an antenna 21, a receiving RF unit 22, an A/D conversion unit 23, a guard interval removal unit 24, a Time Window cancellation unit 25, a buffer 26, and an OFDM demodulation unit 27. The buffer 26 corresponds to a storage unit described in claims hereinbelow.

The antenna 21 receives the radio signal transmitted from the radio transmission apparatus 10. The receiving RF unit 22 performs radio receiving processing including the frequency conversion from a radio frequency (RF) into a baseband frequency and orthogonal demodulation upon the received signal. The A/D conversion unit 23 converts the signal that has been subjected to the radio receiving processing into a digital signal.

The guard interval removal unit 24 removes guard intervals from a signal output from the A/D conversion unit 23 and extracts each OFDM symbol at a time at which the head of the OFDM symbol is received which is detected by predetermined timing detection processing with a pilot signal.

The Time Window cancellation unit 25 performs the Time Window cancellation processing described previously with reference to FIGS. 5A to 5D upon the OFDM symbols output from the guard interval removal unit 24. Time Window cancellation unit 25 corresponds to a processor described in claims hereinbelow.

Figure 8:
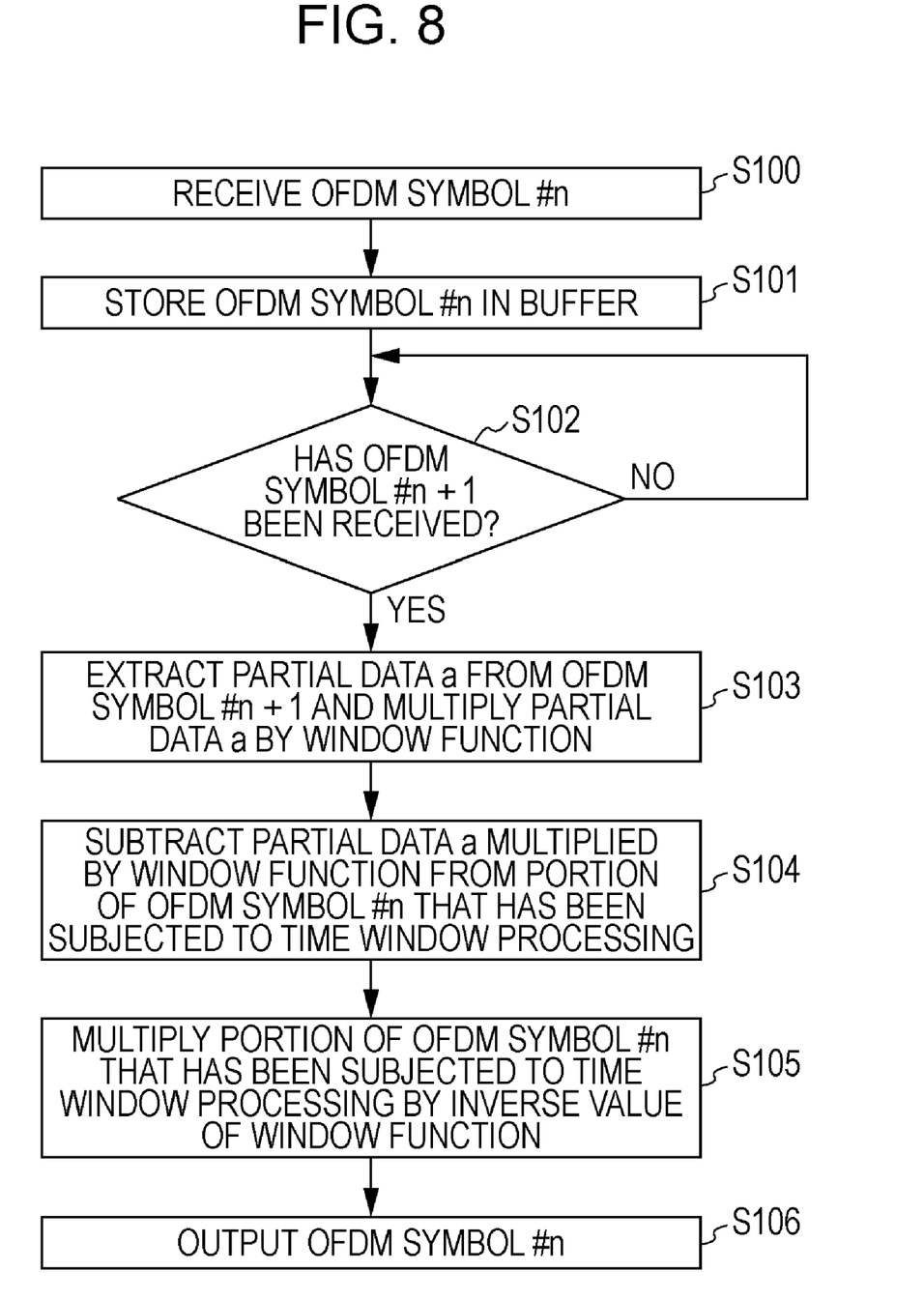
FIG. 8 is a flowchart illustrating a process performed by a Time Window cancellation unit.

FIG. 8 is a flowchart illustrating a process performed by the Time Window cancellation unit 25. When an OFDM symbol #n (n is an integer equal to or larger than zero representing the order of an OFDM symbol) is input from the guard interval removal unit 24 (step S100), the Time Window cancellation unit 25 stores the OFDM symbol #n in the buffer 26 (step S101).

When the next OFDM symbol # n+1 is input (Yes in step S102), the Time Window cancellation unit 25 extracts partial data a from the OFDM symbol #n+1 overlapping the end portion of the OFDM symbol #n that has been subjected to the Time Window processing and multiplies the partial data a by a window function (step S103). The window function is the same as that used in the Time Window processing performed by a transmitter.

The Time Window cancellation unit 25 reads the OFDM symbol #n from the buffer 26 and subtracts the partial data a multiplied by the window function in step S103 from the end portion of the OFDM symbol #n that has been subjected to the Time Window processing (step S104). Subsequently, the Time Window cancellation unit 25 multiplies the end portion of the OFDM symbol #n that has been subjected to the Time Window processing by the inverse value of the window function (step S105).

The Time Window cancellation unit 25 outputs the OFDM symbol #n processed in step S105 (step S106). The process from step S100 to step S105 is performed upon the OFDM symbol #n+1. That is, the OFDM symbol #n+1 is also stored in the buffer 26 and is then subjected to the Time Window cancellation processing with the partial data a of the next OFDM symbol #n+2.

The OFDM demodulation unit 27 performs Fast Fourier Transform (FFT) processing upon OFDM signals that have been subjected to the Time Window cancellation processing so as to separate a signal for each subcarrier from the OFDM signals. The OFDM demodulation unit 27 acquires data by performing demodulation and turbo decoding upon the signal for each subcarrier.

In particular, Time Window cancellation processing according to an embodiment of the present invention is useful for an uplink in an LTE system. In an uplink, another mobile terminal apparatus may use a band adjacent to a band used by a mobile terminal apparatus that is a transmitter. Accordingly, it is desirable that the mobile terminal apparatus perform the Time Window processing so as to prevent the out-of-band leakage of a high-frequency component. In a downlink in an LTE system, a guard band is set between bands set for radio base station apparatuses. Accordingly, the need to prevent the out-of-band leakage of a high-frequency component is lower than that in an uplink. However, in order to prevent the leakage of a high-frequency component, the Time Window processing may be performed in a downlink.

Time Window cancellation processing performed by a radio receiving apparatus in an LTE system has been described, but may be applied to a radio receiving apparatus in any communication system in which a transmitter performs Time Window processing, for example, a wireless Local Area Network (LAN) standardized by Institute of Electrical and Electronic Engineers (IEEE) 802.11 or a Worldwide Interoperability for Microwave Access (WiMAX) standardized by IEEE 802.16.

All examples and conditional language recited herein are intended for pedagogical purposes to aid the reader in understanding the invention and the concepts contributed by the inventor to furthering the art, and are to be construed as being without limitation to such specifically recited example and condition, nor does the organization of such example in the specification relate to a showing of superiority and inferiority of the invention. Although the embodiment of the present inventions has been described in detail, it should be understood that the various changes, substitutions, and alternations could be made hereto without departing from the spirit and scope of the invention.

What is claimed is:

1. A receiver for receiving a signal including a series of symbols, the signal having Time Window processing performed at portions including a boundary of adjacent symbols by a transmitter so as to eliminate a discontinuity between the symbols, the receiver comprising:
    a receiving unit that receives the signal; and
    a processor that extracts the series of symbols and performs an inverse processing of the Time Window processing on the portions in which the Time Window processing is performed at the transmitter,
    wherein the signal includes guard intervals inserted between the adjacent symbols, and the processor detects heads of a first symbol and a second symbol included in the series of symbols, removes the guard intervals from the signal, extracts the first symbol and the second symbol, extracts a portion having a predetermined width in the second symbol which is received after the first symbol, and performs the inverse processing of the Time Window processing on the portions in which the Time Window processing is performed at the transmitter, the portions having the predetermined width.

2. The receiver according to claim 1, wherein the guard intervals are generated by copying the end portion of the symbol and pasting the end portion to the head portion of the symbol.

3. The receiver according to claim 1, wherein the processor multiplies a predetermined window function at the extracted portion having the predetermined width in the second symbol, subtracts the predetermined width multiplied by the window function in the second symbol from the portion in which Time Window processing has been performed having the predetermined width of the first symbol, and multiplies an inverse value of the window function at the portion having the predetermined width in the first symbol.

4. The receiver according to claim 1, further comprising:
    a storage unit for storing the first symbol extracted from the signal;
    wherein the processor multiplies a predetermined window function at the extracted portion having the predetermined width in the second symbol, subtracts the predetermined width multiplied by the window function in the second symbol from the portion in which Time Window processing has been performed having the predetermined width of the first symbol in the storage unit, and multiplies an inverse value of the window function at the portion having the predetermined width in the first symbol.

5. The receiver according to claim 1, wherein the receiver is a mobile terminal apparatus which comprises a Long Term Evolution system.

6. A signal processing apparatus for processing a signal including a series of symbols, the signal having Time Window processing performed at portions including a boundary of adjacent symbols by a transmitter so as to eliminate a discontinuity between the symbols, the signal processing apparatus comprising:
    a receiving unit for receiving the signal; and
    a processor for extracting the series of symbols and performing an inverse processing of the Time Window processing on the portions in which the Time Window processing is performed,
    wherein the signal includes guard intervals inserted between the adjacent symbols, and the processor detects heads of a first symbol and a second symbol included in the series of symbols, removes the guard intervals from the signal, extracts the first symbol and the second symbol, extracts a portion having a predetermined width in the second symbol which is received after the first symbol, and performs the inverse processing of the Time Window processing on the portions in which the Time Window processing is performed at the transmitter, the portions having the predetermined width.

7. A method for receiving a signal including a series of symbols, the signal having Time Window processing performed at portions including a boundary of adjacent symbols by a transmitter so as to eliminate a discontinuity between the symbols, the method comprising:
    extracting the series of symbols; and
    performing an inverse processing of the Time Window processing on the portions in which the Time Window processing is performed at the transmitter wherein the signal includes guard intervals inserted between the adjacent symbols, and the processor detects heads of a first symbol and a second symbol included in the series of symbols, removes the guard intervals from the signal, extracts the first symbol and the second symbol, extracts a portion having a predetermined width in the second symbol which is received after the first symbol, and performs the inverse processing of the Time Window processing on the portions in which the Time Window processing is performed at the transmitter, the portions having the predetermined width.

\* \* \* \* \*